US009841974B2

(12) United States Patent
Wilson et al.

(10) Patent No.: US 9,841,974 B2
(45) Date of Patent: Dec. 12, 2017

(54) RENAMING WITH GENERATION NUMBERS

(71) Applicant: Avago Technologies General IP (Singapore) Pte. Ltd., Singapore (SG)

(72) Inventors: Sophie Wilson, Lode (GB); John Redford, Cambridge (GB); Tariq Kurd, Bishopston (GB)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 506 days.

(21) Appl. No.: 14/530,111

(22) Filed: Oct. 31, 2014

(65) Prior Publication Data

US 2015/0309796 A1 Oct. 29, 2015

Related U.S. Application Data

(60) Provisional application No. 61/984,706, filed on Apr. 25, 2014, provisional application No. 61/984,707, filed on Apr. 25, 2014, provisional application No. 61/984,708, filed on Apr. 25, 2014, provisional application No. 61/984,709, filed on Apr. 25, 2014, provisional application No. 61/984,710, filed on Apr. 25, 2014, provisional application No. 61/984,711, filed on Apr. 25, 2014.

(51) Int. Cl.
*G06F 9/38* (2006.01)
*G06F 9/30* (2006.01)

(52) U.S. Cl.
CPC ........ *G06F 9/30098* (2013.01); *G06F 9/3012* (2013.01); *G06F 9/3802* (2013.01); *G06F 9/384* (2013.01); *G06F 9/3842* (2013.01)

(58) Field of Classification Search
CPC .............................. G06F 9/384; G06F 9/3842
See application file for complete search history.

(56) References Cited

U.S. PATENT DOCUMENTS 7,069,411 B1 * 6/2006 McMinn ............... G06F 9/3836
711/202
2005/0138334 A1 * 6/2005 Sodani ............... G06F 9/30098
712/218

FOREIGN PATENT DOCUMENTS

WO      EP 0863460 A2 *  9/1998  ............... G06F 9/38
WO      EP 2937775 A1 * 10/2015  ........... G06F 9/3012

OTHER PUBLICATIONS

Zeng et al, Register Versioning: A low-complexity implementation of register renaming in out-of-order microarchitectures, 2009, IEEE, 0190-3918/09, 9 pages.*
Zeng et al, Energy-Efficient renaming with register versioning, Aug. 2009, ACM, 978-1-60558-684-7/09/08, 6 pages.*

* cited by examiner

*Primary Examiner* — Andrew Caldwell
*Assistant Examiner* — Jyoti Mehta
(74) *Attorney, Agent, or Firm* — Sterne, Kessler, Goldstein & Fox PLLC

(57) ABSTRACT

A processor including a register file having a plurality of registers, and configured for out-of-order instruction execution, further includes a renamer unit that produces generation numbers that are associated with register file addresses to provide a renamed version of a register that is temporally offset from an existing version of that register rather than assigning a non-programmer-visible physical register as the renamed register.

23 Claims, 3 Drawing Sheets

RENAMING WITH GENERATION NUMBERS

CROSS REFERENCE TO RELATED APPLICATIONS

This patent application claims the benefit of U.S. Provisional Patent Appl. No. 61/984,706, filed Apr. 25, 2014, U.S. Provisional Patent Appl. No. 61/984,707, filed Apr. 25, 2014, U.S. Provisional Patent Appl. No. 61/984,708, filed Apr. 25, 2014, U.S. Provisional Patent Appl. No. 61/984,709, filed Apr. 25, 2014, U.S. Provisional Patent Appl. No. 61/984,710, filed Apr. 25, 2014, and U.S. Provisional Patent Appl. No. 61/984,711, filed Apr. 25, 2014. Each of the listed applications are incorporated herein by reference in their entireties.

FIELD OF THE DISCLOSURE

The present disclosure relates generally to computer processors.

BACKGROUND

Advances in semiconductor manufacturing have made it possible to incorporate large amounts of logic circuitry on an integrated circuit. In turn, this has led to advances in digital systems architecture. One particular area of digital systems architecture that has benefited greatly from the capability to include vast arrays of logic circuitry on a single integrated circuit is processor design.

BRIEF DESCRIPTION OF THE DRAWINGS

Embodiments are described with reference to the accompanying drawings. In the drawings, like reference numbers indicate identical or functionally similar elements. Additionally, the left most digit(s) of a reference number identifies the drawing in which the reference number first appears.

FIGS. 1 and 2 illustrates various components, their arrangements, and interconnections, and is not drawn to scale.

DETAILED DESCRIPTION

Figure 1:
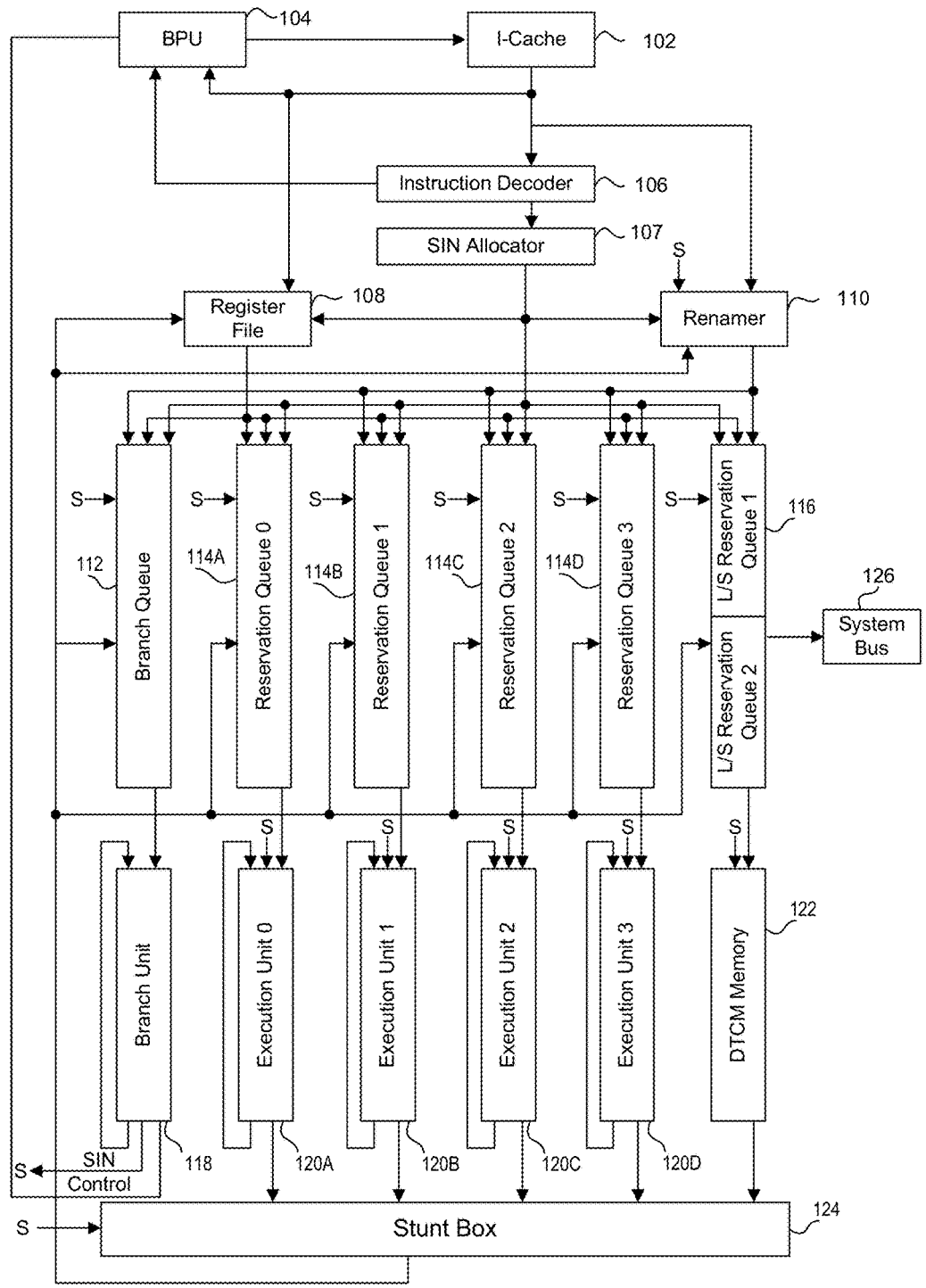
FIG. 1 is a high-level block diagram of an exemplary processor.

The following Detailed Description refers to accompanying drawings to illustrate exemplary embodiments. References in the Detailed Description to "one exemplary embodiment," "an illustrative embodiment", "an exemplary embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure.

It is to be understood that the phraseology or terminology herein is for the purpose of description and not of limitation, such that the terminology or phraseology of the present specification is to be interpreted by those skilled in relevant art(s) in light of the teachings herein.

Terminology

The terms, chip, die, integrated circuit, semiconductor device, and microelectronic device, are often used interchangeably in the field of electronics.

FET, as used herein, refers to metal-oxide-semiconductor field effect transistors (MOSFETs). An n-channel FET is referred to herein as an NFET. A p-channel FET is referred to herein as a PFET.

CMOS refers to a semiconductor manufacturing process in which both NFETs are PFETs are formed in an integrated circuit.

CMOS circuit refers to a circuit in which both NFETs and PFETs are used together.

VLIW is an acronym for Very Long Instruction Word.

VLIW instruction, as used in the description of exemplary embodiments herein, refers to a set of instructions grouped together for presentation to the instruction decoder. The individual instructions in the set of instructions are assigned to one of a plurality of execution pipes for execution.

IC0 refers to a pseudo-stage which is on the input to the instruction cache.

IC1 refers to the instruction cache stage. Fetch requests to the instruction cache are made in this cycle, along with calculations to determine which PC to fetch next. VLIW instructions previously requested are supplied in this stage.

DE1 refers to the first stage of the instruction decoder.

DE1_operation refers to a logical operation performed by the first stage of the instruction decoder.

DE1_time refers to a cycle in which a DE_1 operation occurs.

DE2 refers to the second stage of the instruction decoder.

DE2_operation refers to a logical operation performed by the second stage of the instruction decoder.

DE2_time refers to the cycle in which the reading and renaming of the general register file (GRF) and predicate register file (PREG) occurs.

RS refers to a reservation station. There are several different reservation stations that can be enqueued to. In the best case this is a single cycle stage, however operations may end up queuing here for many cycles.

EXn refers to an nth stage of an execution pipe. Examples of execution pipes include ALU short and long pipes, BRANCH and the Load Store Unit.

SHP refers to a short execution pipe. A short execution pipe is used to perform single cycle operations.

LOP refers to a long execution pipe. A long execution pipe is used to execute instructions that take 2-8 cycles to complete.

LSU refers to the load store unit.

DTCM refers to a data tightly coupled memory.

PBUS refers to a bus that connects to a peripheral memory.

DCACHE refers to the data cache used to cache accesses to peripheral memory.

Enqueue refers to the action in which a VLIW instruction in DE2 is split into its component operations and then move forward down the pipe into the reservation stations.

Issue refers to moving an operation from the reservation station to an execution unit. An operation is referred to as being issued when it is moved from the reservation station to an execution unit. An operation is a component part of a VLIW instruction.

Current PC refers to the value of the program counter (PC) for the instruction currently in a given stage. Each stage of the pipe will have its own version of the current PC.

Next PC refers to the next PC to fetch from the Icache. For straight line code this will be current PC+current instruction width, for redirected code it will be the new target PC.

Loop start address refers to the address of the first instruction in a loop body, i.e., the address to branch to for starting a new loop iteration.

Loop end address refers to the address of the first instruction after a loop body, i.e., the address to branch to for naturally exiting the loop.

Loop body refers to the instructions beginning with the loop start address and ending with the loop match address.

Loop match address refers to the address of the last instruction in a loop body.

Loop count refers to the number of iterations of the loop that should be executed. This comes from either an immediate field for LOOP operations, or a general register for ZLOOP and ZLOOPS operations.

SIN refers to the Speculation Index Number, which is used to identify instructions enqueued speculatively in the shadow of a branch.

SIN resolution refers to determining whether a branch was correctly speculated or not. SIN resolution is performed in EX1.

SIN validation refers to a branch in EX1 that was correctly speculated, which in turn will validate the SIN associated with the operations in the shadow of the correctly speculated branch. A validated operation is one which will update the architectural state.

SIN cancellation refers to a branch in EX1 that was incorrectly speculated, which in turn will cancel all outstanding SINs, and perform an EX1 redirect, effectively removing all operations that were in the shadow of the branch it from the execution pipe. In one embodiment, removing the operation that were in the shadow of the incorrectly speculated branch includes changing the state of a bit associated with each of those instruction in the execution pipe.

State coherency enforcement (SCE) refers to actions performed by an internal mechanism to prevent future operations from seeing an incoherent machine state.

Trap events refers to the set of synchronous, asynchronous and fault events.

Synchronous trap events relate to a specific instruction and are detected in time to prevent the instruction causing the event from being enqueued. The Supervisor Call (SVC) instruction fits into this category. These are precise as they occur in an architecturally defined place in the instruction stream.

Asynchronous trap events (interrupts) occur independently from the current instruction sequence. Asynchronous exceptions fit into this.

Fault trap events prevent program flow from recovering. Examples of fault trap events are a misaligned PC and a data abort. Faulting operations with a register destination must complete a register value.

A processor architecture is disclosed that includes a register file having a plurality of registers, and is configured for out-of-order instruction execution, further includes a renamer unit that produces generation numbers that are associated with register file addresses to provide a renamed version of a register that is temporally offset from an existing version of that register rather than assigning a non-programmer-visible physical register as the renamed register. The processor architecture includes a small reset DHL Gshare branch prediction unit coupled to an instruction cache and configured to provide speculative addresses to the instruction cache. The processor architecture is suitable for implementation in an integrated circuit. Such an integrated circuit is typically implemented with CMOS circuitry.

In typical embodiments a processor in accordance with this disclosure is implemented in an integrated circuit as an embedded processor.

FIG. 1 is a high-level block diagram illustrating the major blocks of an exemplary processor in accordance with the disclosure. The exemplary processor includes an instruction cache 102 coupled to receive a VLIW instruction address from a branch prediction unit 104, and further coupled to provide an output to branch prediction unit 104, an instruction decoder 106, a register file 108, and a generation renamer 110. Generation renamer 110 is coupled to branch execution unit 118 to receive a SIN control signal, coupled to the SIN Allocator 107 to receive a SIN number, coupled to a stunt box 124 to receive an output from an operand copy network, and coupled to the branch reservation queue 112, execution pipe reservation queues 114A, 114B, 114C, 114D, and load/store reservation queue 116. Register file 108 is coupled to stunt box 124 to receive input from the operand copy network, and is further coupled to the branch reservation queue 112, execution pipe reservation queues 114A, 114B, 114C, 114D, and load/store reservation queue 116. Branch reservation queue 112 is coupled to branch execution unit 118. Execution pipe reservation queues 114A, 114B, 114C, 114D are each respectively coupled to corresponding execution pipes 120A, 120B, 120C, and 120D. Execution pipes 120A, 120B, 120C, and 120D are each coupled to provide output to stunt box 124. Each of execution pipes 120A, 120B, 120C, and 120D are respectively coupled to provide their output back to their inputs, and each is further coupled to the output of branch execution unit 118 to receive the SIN control signal. A memory 122 is coupled to the load/store unit 116. And load/store unit 116 is further coupled to a system bus 126.

Instruction cache 102 holds VLIW instructions that have been previously fetched by an instruction fetch unit (not shown). The VLIW instructions are typically fetched from a memory disposed external to the processor itself. Branch prediction unit 104 is shown coupled to instruction cache 102. Branch prediction unit 104 provides the address of the VLIW instruction to fetch. If the requested VLIW instruction is present in instruction cache 102 then it is provided to an instruction decoder 106. If the requested VLIW instruction is not present in instruction cache 102 then a cache miss has occurred and the requested instruction is fetched from a memory that is disposed outside of the processor.

Branch prediction unit 104 has several functions, including providing the program counter value needed by instruction cache 102, and the program counter value needed by different stages and logic blocks throughout the processor. For sequentially executing program code, the program counter value simply changes by the length of the instruction just fetched. But when a branch instruction is detected, then branch prediction unit 104 determines what from what address the next instruction should be fetched. In this exemplary processor, branch prediction unit 104 uses a small reset DHL Gshare branch prediction mechanism to determine the next instruction address.

Instruction decoder 106 decodes the content of the VLIW instructions and provides control information to various other blocks of the processor.

Register file 108 contains a predetermined number of programmer-visible registers. These registers hold values that are used during the execution of a program.

Individual instructions obtained from the VLIW instruction are enqueued into a selected reservation queue. When the operands needed for execution of an enqueued instruction become available, that instruction is issued to the execution pipe associated with the selected reservation queue.

Generation renamer 110 is used to assign generation numbers to register instances in instructions when those register instances would conventionally be reassigned to a different non-programmer-visible physical register.

The reservation queues hold instructions that are waiting to be issued.

Stunt box 124 provides a mechanism for receiving and distributing the outputs of the execution pipes. Stunt box 124 provides data to an operand copy network. The operand copy network allows all the results of the execution pipes to be made available to other blocks within the processor. In this way, an instruction waiting for an operand to be produced from the execution of another instruction does not have to wait for that operand to be written back to the register file and then read out of the register file. Rather the required operand is made available, via the operand copy network, to all the locations throughout the processor that are waiting for that particular result.

System bus 126 provides a mechanism for the embedded processor to communicate with other logic blocks on the integrated circuit that are external to the processor itself.

Generation Renaming Overview

Processors comprise a number of different physical resources, for example registers, execution units, arithemetic units, memory, control logic, etc. One of the physical resources included in processors is an architecturally visible set of registers that are available to programmers for use when creating software. These registers physically store information to be used by the processors, as directed by the software. The number of available registers within the set of registers is determined based on the design of the processor and the instruction set implemented. Because there are a set number of registers, programmers are often required to reuse registers when creating their software.

Because registers are reused, the processor, when executing the software needs to make sure that it maintains the correct value of each register for each instruction that is executing or is scheduled to execute in order to ensure that programs execute properly. This is true for out of order machines that can execute instructions in different orders depending on what resources are available, and even more so for very large instruction word (VLIW) processors which can fetch, decode, and execute multiple instructions in parallel.

In order to address these issue, generation renaming was developed. Generation renaming allows a processor to maintain a value for each architectural register in a register file. In addition the processor maintains multiple versions, named generations, of each register. Each generation represents a new value that will, or may, be stored in a register. Different registers may use different generations at the same time. For example, the machine may be using generations 2, 3, and 4 of R0 while using generations 5 and 7 of R1. Architecturally, each register has a value associated with it, a means of maintaining which generations are currently being used, and a set of pointers used to identify the last known correctly used generation and any speculatively used generations. These components will be described in more detail below.

As individual instructions are in flight, for example waiting to be executed, being executed, or waiting to be retired, the registers associated with the individual instructions maintain descriptors indicating which generation of each register is being used by this instruction. Thus, multiple instructions using the same register can be in flight at the same time while allowing the program to execute as intended. Instructions can be maintained until the correct generation of each of their source registers is available. Instructions can execute, even if they use the same destination register. And instructions can retire, even if that would modify the same register, without causing errors in the program execution. With minimal additional logic, mostly related to forwarding the correct values to the correct instructions, the processor can execute while maintaining a register file associated with architecturally visible registers. For example, as instructions retire, the value of the destination register can be forwarded to in-flight instructions that require that register with that generation. In an example, if this is also the last generation of the register in flight, the value can also be written to the register file.

Generations allow the processor to fetch, queue, and execute multiple instructions at the same time that use the same architectural register. This reduces or eliminates the need to stall the execution pipeline to wait for results of prior instructions. For example, a programmer may wish to execute the following code using only 5 registers:

Inst 0: Add R0, R1, R2
Inst 1: Mul R1, R0, R0
Inst 2: Add R0, R4, R5
Inst 3: Mul R4, R0, R0.

In this code, the programmer adds the values in R1 and R2 and stores the result in R0. That result (stored in R0) is then squared and stored in R1. Next, the values in R4 and R5 are added and the result is stored again in R0. Similarly, this result is squared and stored in R4.

Typically, a processor must either stall Inst 2 until Inst 1 is complete (or risk R0 containing the wrong value when Inst 1 executes), or use a register that is not visible to the programmer to enlarge the set of available registers and remove the write after read (WAR) fault caused by reusing register R0. If this is not done, the value in R0 may be incorrect, thus storing an unexpected value in R1. Stalling the machine each time a fault is encountered can significantly reduce the performance of the processor. Increasing the size of the register file that stores both the architectural registers and the non-programmer visible registers can alleviate this issue. But this requires increasing the forwarding logic and renaming logic to track which registers store the value for which architectural registers being used by which instructions. And an increase in the number of physical registers increases power consumption and chip area.

Generation renaming allows the processor to maintain a register file with architectural registers, while allowing the processor to enqueue and execute instructions in parallel even when those instructions specify the use of the same register. Specifically, this allows two instructions that change the value of the same register to both be enqueued, issued, and executed without affecting the execution of the remainder of the software that depends on either instruction. Each time a register is used as a destination, it is tagged with a new generation number. Each instruction that uses the register after that, will use the new generation, until the generation number is increased again. Once the initial instruction executes and a value is determined for the register, all pending instructions that use that register and that generation number can be updated to indicate they have a valid value for this register.

Returning to the example above, we will use the convention Rn®m to represent Rn generation m. For the above code segment, we will assume that, prior to execution, the generation information of the registers is R0®0, R1®1, R2®1, R4®3, and R5®0. In this exemplary embodiment, when the instructions are enqueued, the generation numbers are assigned as follows:

Inst 0: Add R0®1, R1®1, R2®1 (Generation of R0 is increased, R1 and R2 remains the same)
Inst 1: Mul R1®3, R0®1, R0®1 (Generation of R1 is increased, R0 remains the same)
Inst 2: Add R0®2, R4®0, R5®1 (Generation of R0 is increased, R4 and R5 remains the same)
Inst 3: Mul R4®4, R0®2, R0®2 (Generation of R4 is increased, R0 remains the same).

Thus generation renaming allows Inst 2 to be issued and executed without affecting the results of Inst 1. In the above example, if Inst 2 executes before Inst 1, the results of Inst 2 will be forwarded to all other instructions that use R0®2 without affecting instructions that use other generations of R0. For example, once executed, an instruction's results may be copied by any inflight instructions that are waiting for those results. For example, if we have two execution units, each of our instructions can be queued to a different execution unit. If Add instructions execute faster than Mul instructions, then we might have something like what follows:

Time 1: Put Inst 0 in Queue 0; Put Inst 1 in Queue 0; Put Inst 2 in Queue 1; Put Inst 3 in Queue 1
Time 2: Execute Inst 0 and Inst 2 (neither depends on the results of any previous instructions)
Time 3: Retire R0®1; Update Inst 1 and Inst 3 appropriately; Execute Inst 1 and Inst 3, using the results from Inst 0 and Inst 2 (this assumes that for this processor the result from Inst 2 can be forwarded back to Inst 3).
Alternatively:
Time 1: Put Inst 0 in Queue 0; Put Inst 1 in Queue 0; Put Inst 2 in Queue 1; Put Inst 3 in Queue 1
Time 2: Execute Inst 0 and Inst 2 (neither depends on the results of any previous instructions)
Time 3: Retire R0®1; Update Inst 1 appropriately; Start execution Inst 1, using the results from Inst 0
Time 4: Retire R0®2; Update Inst 3 appropriately; Start execution Inst 3, using the results from Inst 2.

Thus generation renaming allows multiple instructions to exist in the processor concurrently. These instructions can be executed out of order while appearing to be executing in order (i.e., the results from the out of order execution and the in order execution are identical). Generation renaming allows this to happen by allowing multiple versions of each register to exist in the processor so that instructions can update and use the same register without interfering with the execution of each other.

Generation Renaming Structure

Figure 2:
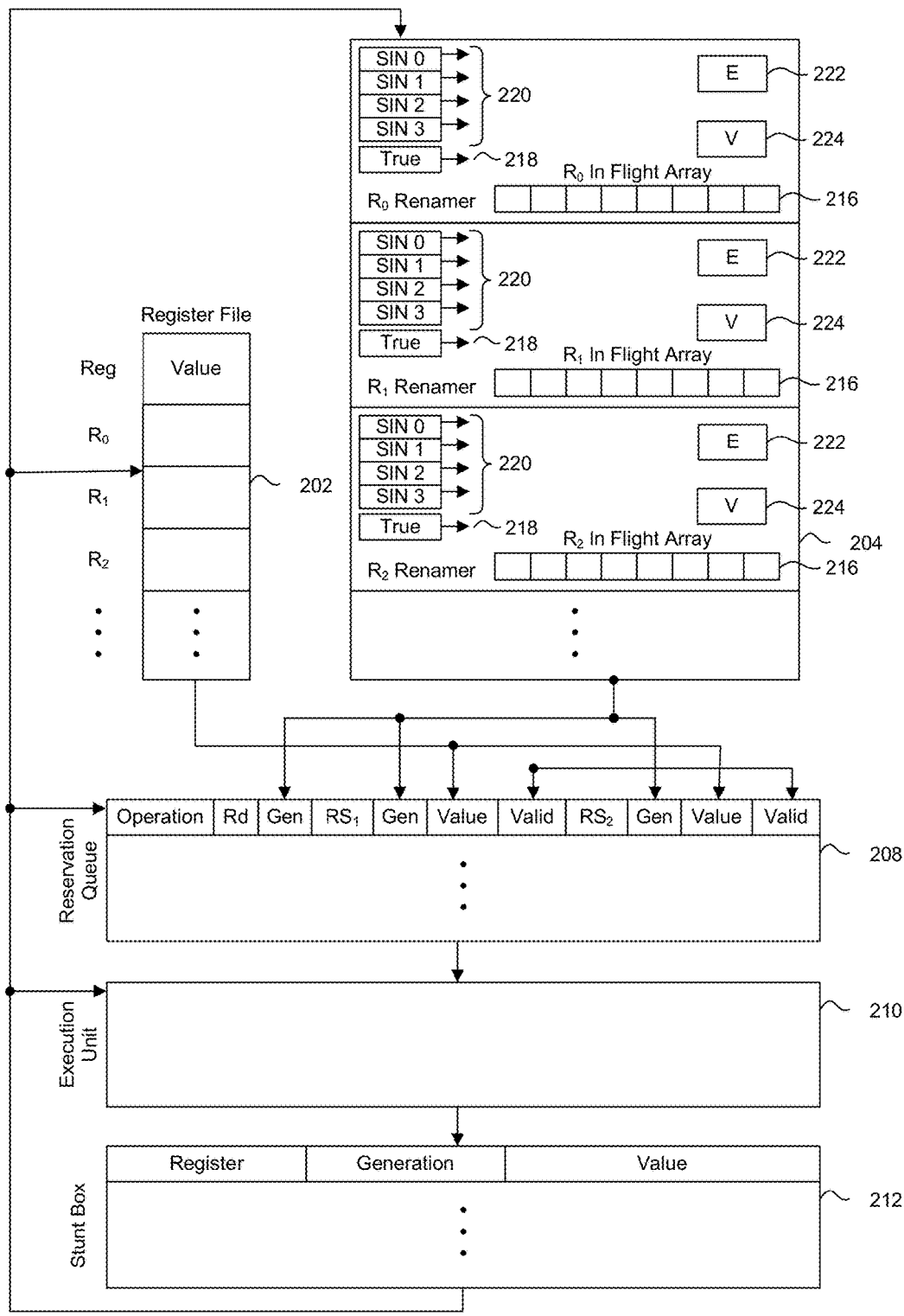
FIG. 2 is a high-level block diagram of an exemplary processor with register renaming implemented.
Figure 3:
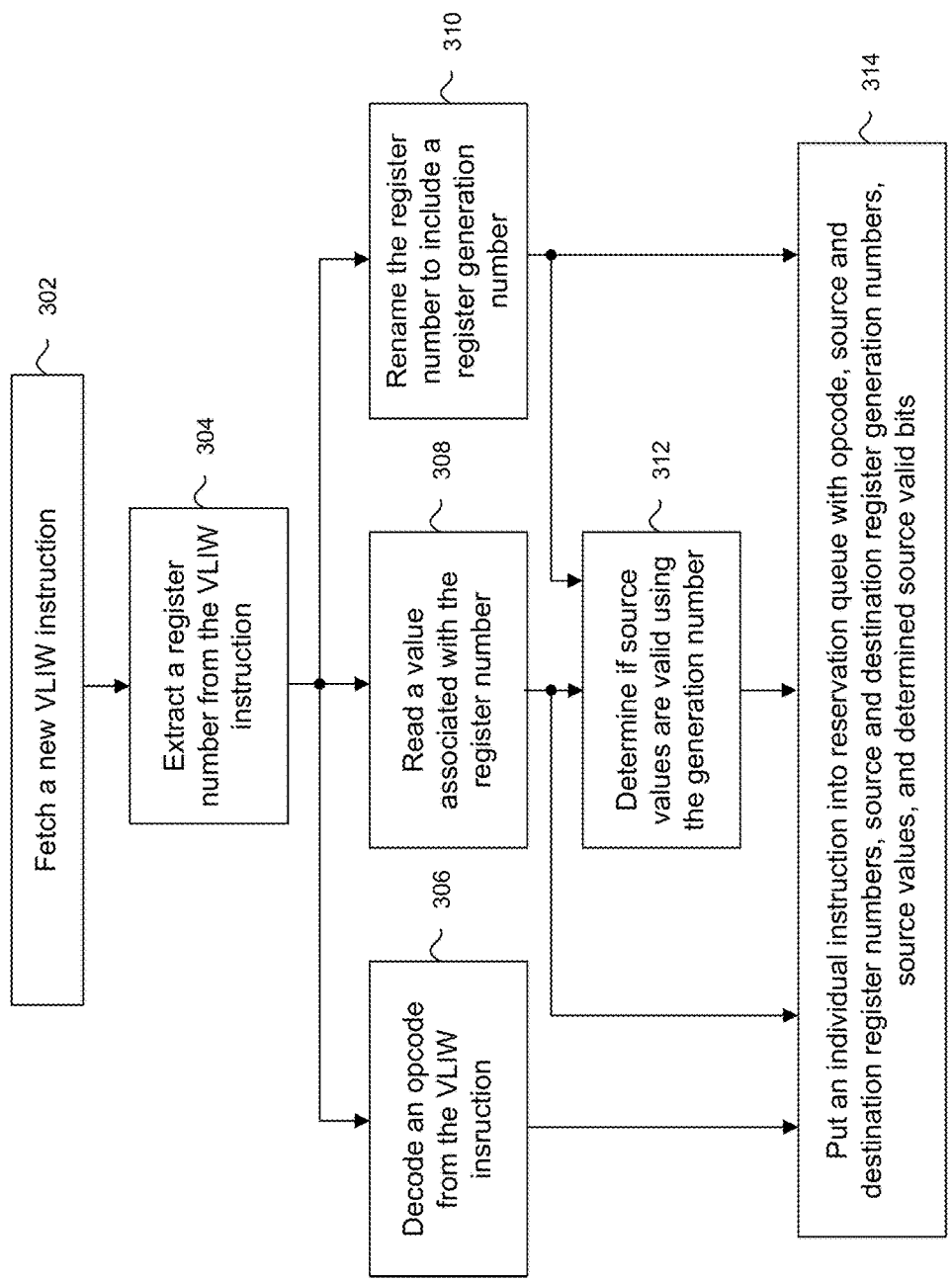
FIG. 3 is flowchart illustrating a register renaming process, according to an example embodiment.

Referring to FIG. 2, an exemplary embodiment of a processor includes a register file 202, a renamer 204, a reservation queue 208, an execution unit 210, and a stunt box 212.

Register file 202 is configured to store the value of each architectural register. For example, register file 202 can store the values for general registers R0-R31, predicate registers P0-P7, and multiply-and-accumulate (MAC) registers M0-M7. In an embodiment, register file 202 includes write control circuitry that controls when results from the execution pipes are to be written into the architectural registers of the register file.

In an embodiment, the processor includes renamer 204 for one or more of the architectural registers. Renamer 204 can include an inflight array 216, a true pointer 218, one or more speculative instruction number (SIN) pointers 220, an enable circuit 222, and a validation circuit 224. Each inflight array 216 indicates which generations of its corresponding register are currently being used by the processor. For example, inflight array 216 may indicate that generations 2, 4, and 5 for R0 are currently being used by the processor.

Thus, each inflight array 216 maintains a list of all generations for each register that are currently being used by instructions in the processor. Inflight array 216 can be a circular array. Thus, after allocating the last generation in the array, for example generation 7, the next generation allocated would be generation 0. These generations may be used in the reservation queue, Load/Store (L/S) queues, execution units, stunt box, etc.

In order to determine which generation is the latest generation in use, true pointer 218 is used for each architectural register. Each true pointer 218 points to a location in the associated inflight array 216 which represents the last generation of this register that was used as a destination for an instruction. For example, in the above code fragment, after Inst 3 is fetched and renamed, the true pointer 218 for R0 would point to R0®2, the true pointer 218 for R1 would point to R1®3, and the true pointer 218 for R4 would point to R4®4. True pointer 218 can be used in several ways. For example while an instruction is being decoded, true pointer 218 points to the generation of the registers being used for the sources of the instruction. For the destination, the generation can be set to the next generation after the true pointer.

In an embodiment, when a result is retired, a few different things can happen. The value for this generation of the register can be forwarded to all instructions using this generation of this register that are currently in the reservation queues and the valid bit for those registers can be set. The valid bits allow the processor to determine which instructions are ready to issue for execution. In an embodiment, if the value is not speculative, e.g., it was not generated after a conditional branch instruction whose results were guessed, the in-flight bit for this generation in the associated inflight array 216 is cleared.

Enable circuit 222 also uses the retired result value, retired result generation number, and true pointer 218 to determine if this result should be written to register file 202. True pointer 218 points to the last generation of a register that was non-speculatively executed. That is, true pointer 218 points to the last generation of a register that was allocated prior to any conditional branches that the processor has speculatively predicted. If the retired result generation number matches true pointer 218, there are no non-speculative instructions in-flight that write to this register. At that point the value can be written to register file 202. Thus, enable circuit 222 can set the write enable for this register and have the retired result value written to register file 202. This can limit the number of unnecessary writes that are made to register file 202.

In addition to true pointer 218, one or more SIN pointers 220 are also allocated to each register. SIN pointers 220 are used to track generations of a register which have been allocated to instructions which have been speculatively fetched, enqueued, or executed. For example, the following code segment retrieves a value from memory in Inst 0 and executes Inst 1-6 the number of times equal to the retrieved value. Inst 1-6 takes an array starting at memory location 0x00200020 and doubles each element:
Inst 0: Ld R0, [0x10]
Inst 1: Add R1, 0x00200020
Inst 2: LD R2, [R1]
Inst 3: Mul R2, R2, 0x2
Inst 4: ST R2, [R1]
Inst 5: Sub R0, R0, 0x01
Inst 6: Bnz Inst 1.

When the processor reaches Inst 6, it must make a determination to either return to Inst 1, or continue execution. This determination is based on the value in R0. Inst 0 attempted to load R0 with the value located at memory location 0x10. This may take some time to retrieve from memory, especially if the value is located in main memory, rather than in a cache. While this value is being retrieved from memory, the processor may decide to speculatively execute additional instructions. It may determine, based on past history for example, to branch back to Inst 1.

Because of the time required to retrieve information from main memory, this loop may be speculatively executed multiple times. While the processor knows that the results from the first execution are correct, each additional iteration will be speculative until we receive the value from memory requested by Inst 0.

Thus, for each speculative execution of Inst 6, a new SIN pointer 220 is allocated. For each SIN pointer 220, a new version of R1 and R0 are allocated (see Inst 1 and 5), and two new versions of R2 are allocated (see Inst 2 and 3) (the store instruction—Inst 4—does not have a register destination). After 4 runs of the loop, R1 and R2 may look like this:
R1.True Pointer=>R1®1
R1.SIN0 Pointer=>R1®2
R1.SIN1 Pointer=>R1®3
R1.SIN2 Pointer=>R1®4
R1.SIN3 Pointer=>R1®5
R1.Inflight Array=011111000 . . . 0
R2.True Pointer=>R2®0
R2.SIN0 Pointer=>R2®2
R2.SIN1 Pointer=>R2®4
R2.SIN2 Pointer=>R2®6
R2.SIN3 Pointer=>R2®8
R2.Inflight Array=1111111110 . . . 0

If at this point, the load to R0 completed and it has a value greater than 4, then each of the speculatively executed instructions is confirmed, the SIN3 pointer for each of these registers is copied into the True pointer, and execution continues without speculation. But if the value is less than 4, for example 2, one or more the of executions must be unwound. The correct pointer, for example SIN pointer, is copied into the True Pointer, all in flight bits between the new true pointer and the most recently allocated SIN pointer, for example SIN3 pointer, are cleared, for example R1.Inflight Array bits 4-5 and R2.Inflight Array bits 5-8.

Because the results from speculatively executed instructions are not loaded into register file 202, no changes need to be made to register file 202.

In an embodiment, renamer 204 can also determine if the values in the register file are valid. When an instruction is decoded and enqueued to the reservation queue, the value of that register stored in register file 202 is also copied into the reservation queue. In addition, a valid bit is set indicating whether this source register value is valid or not. Validation circuit 224 handles setting that bit. If the generation of a register pointed to by the true pointer (or the most recently allocated SIN pointer, if we are speculatively executing this instruction) is 1, then the valid bit is cleared, and if it is 0, then the valid bit is set. This means that if the value for this generation of the register is still being calculated (i.e., still inflight), then the value in register file 202 is not valid, but if it has been retired, then the value in register file 202 is valid. Once all the source register valid bits are set, an instruction is ready to be issued for execution.

Generation Renaming Process

In an exemplary embodiment, the processor can be configured to perform generation renaming while a VLIW instruction is being decoded. In another embodiment, generation renaming can be performed after a VLIW instruction has been decoded.

At step 302, the processor fetches a VLIW instruction. For example a processor fetches the next cache line pointed to by a program counter (PC). This cache line can include a VLIW instruction that can be made up of multiple individual instructions. For example, depending on implementation details, VLIW instructions can be made up of 2, 4, or 8 individual instructions. In other embodiments, the VLIW instructions can be made up other numbers of individual instructions, for example 3, depending on the implementation details, as would be understood by a person skilled in the art.

At step 304, the registers used as sources and destinations within the VLIW instruction can be identified. This information can be provided to the remainder of the instruction decode unit, the register file, and the renamer as described in more detail below. As part of the instruction decode, registers associated with each instruction can be identified (i.e., the source and destination registers). In another embodiment, the registers can be identified as part of a separate unit and passed to the instruction decode unit, register file, and renamer.

At step 306, one or more instructions within the VLIW instruction can be decoded. In one embodiment this is part of the second phase of the instruction decode unit, the first phase comprising identifying the registers. One advantage of doing a two-step decode is that register identification, which may be simple and fast, can happen early in the cycle, allowing other elements to process the instruction that rely on the registers being identified.

At step 308, the register file, for example register file 202, can be accessed and the value of a generation of any source registers used in the VLIW instruction can be identified. At this point, the last generation of a source register that was written to the register file is identified. This value may or may not be valid. Thus, this value is speculatively associated with the VLIW instruction. As will be addressed below, a valid bit will be set indicating whether this value is the correct value for the generation needed for the source register for this VLIW instruction.

At step 310, a generation number is associated with the register number that was identified in step 304. This generation number indicated which value associated with a register number is required for completing an instruction. For example, if a VLIW instruction indicated that it uses register R0 as a source register, then the latest generation of R0 that is currently being used in the processor can be associated with the VLIW instruction. This may be a generation of R0 that is currently in-flight and will become available sometime in the future. Or this may be a generation of R0 that was calculated earlier and is available for use. In another example, if the VLIW instruction indicates that the register number is a destination register, then the next available non-inflight generation of R0 is associated with this VLIW instruction. For example, if generations 3-6 are currently in flight, R0 generation 7 will be associated with the VLIW instruction.

In an embodiment, pointers, such as the true pointer or SIN pointers discussed above, can identify the latest generations of a register currently in flight. For example, if instructions are currently being fetched that are not speculative (i.e., all prior branch instructions have been resolved) the true pointer may be used to identify the latest valid generation of a register. If instructions are being speculatively fetched then a SIN pointer may be used to identify the latest valid generation of a register.

In an embodiment, source registers may be tagged to indicate that they use a value produced by this VLIW instruction. For example, a first individual instruction may increment a value that was retrieved by a second individual instruction, where both are contained within the same VLIW instruction. In this embodiment, the source register identified for the first individual instruction can include a tag within the VLIW instruction indicating that it uses the results from another individual instruction within the VLIW instruction. If so tagged, rather than being associated with last in-flight generation available for the register, the source register for the first individual instruction will be associated with the next available non-inflight generation. This will be the same generation for the destination of the second individual instruction, thereby indicating that the results of the second individual instruction can be forwarded to the first individual instruction when available.

At step 312, for identified registers that are identified as source registers for the VLIW instruction, determine whether the value retrieved from the register file is valid. For example, the inflight array for the register number can be examined. If the pointer to the last generation used indicates that that generation is not currently inflight and the last generation used matches the generation of the source register for the VLIW instruction, then the valid bit can be set. The value retrieved from the register file is the correct version for the generation of the source register being used. In an embodiment, the valid bit will only be set if there are no SIN pointers being used (i.e., no instructions are being speculatively executed) and the true pointer points to the identified register.

At step 314, the individual instructions are added to the reservation queues. This includes adding the opcode of the instruction to be performed, source and destination register numbers, associated generation numbers, values for the source registers, and source valid bits are also added to the reservation queue.

CONCLUSION

It is to be appreciated that the Detailed Description section, and not the Abstract of the Disclosure, is intended to be used to interpret the claims. The Abstract of the Disclosure may set forth one or more, but not all, exemplary embodiments, and thus, is not intended to limit the scope of the subjoined Claims in any way.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the subjoined Claims and their equivalents.

What is claimed is:

1. An apparatus comprising:
   a register, addressed by a register address, configured to store a value;
   a renamer configured to receive the register address and an indication of whether the register is a destination or a source for a fetched instruction and generate an inflight generation number associated with the register for the fetched instruction; and
   a reservation queue, communicatively coupled with the register and the renamer, configured to concurrently store the register address and the inflight generation number.

2. The apparatus of claim 1, wherein the reservation queue is further configured to store an instruction opcode of the fetched instruction.

3. The apparatus of claim 1, wherein the register and the renamer are configured to provide data to the reservation queue concurrently.

4. The apparatus of claim 1, wherein the renamer is further configured to store an inflight array that indicates which generation of the register is currently being used.

5. The apparatus of claim 4, wherein the renamer is further configured to maintain a true pointer that indicates a latest confirmed returned generation of the register.

6. The apparatus of claim 5, wherein the renamer is further configured to generate a valid bit indicating whether a value associated with the inflight generation number is valid based, at least in part on, the inflight array and the true pointer.

7. The apparatus of claim 6, wherein the reservation queue is further configured to store a value and the valid bit responsive to the register being a source register for the fetched instruction.

8. The apparatus of claim 4, wherein the renamer is further configured to maintain a Speculative Index Number (SIN) pointer that points to the inflight generation number responsive to the fetched instruction being executed speculatively.

9. The apparatus of claim 8, wherein the renamer is further configured to update a true pointer to equal the SIN pointer and clear the SIN pointer responsive to the fetched instruction being executed speculatively and confirmed.

10. The apparatus of claim 8, wherein the renamer is further configured to update the inflight array and clear the SIN pointer responsive to the fetched instruction being executed speculatively and cancelled.

11. The apparatus of claim 1, wherein to generate the inflight generation number, the renamer is configured to select a next non-inflight generation number responsive to a tick bit being set in the fetched instruction.

12. The apparatus of claim 1, wherein the renamer is further configured to receive results from the fetched instruction and a destination register address, update an inflight array, and enable the register to be updated with the results responsive to there being no further generations of the register in flight.

13. The apparatus of claim 1, wherein the renamer is further configured to update an inflight array, and the register is configured to store results of the fetched instruction if there are no later inflight generation numbers for the register.

14. The apparatus of claim 13, further comprising register write control logic, wherein the renamer is further configured to inform the register write control logic whether the results should be stored.

15. A method comprising:
    receiving, by a register renamer, a register address specified by a fetched instruction;
    generating, by the register renamer, an inflight register generation number based at least in part on the register address, the inflight register generation number comprising a newest inflight generation number associated with the register address when the register address is a source register address, or an inflight generation number after the newest inflight generation number associated with the register address when the register address is a destination register address; and
    providing the generated inflight register generation number to a reservation queue.

16. The method of claim 15, further comprising providing the inflight register generation number concurrently with a register file providing a value.

17. The method of claim 15, further comprising maintaining an inflight array that indicates which generations of a register are currently being used.

18. The method of claim 17, further comprising maintaining a true pointer that indicates a latest confirmed returned generation of the register.

19. The method of claim 18, further comprising generating a valid bit indicating that a value in a register file is valid based on the inflight array and the true pointer.

20. The method of claim 17, further comprising maintaining a Speculative Index Number (SIN) pointer that points to the inflight generation number associated with the fetched instruction responsive to the fetched instruction being executed speculatively.

21. The method of claim 20, further comprising updating a true pointer and clearing the SIN pointer responsive to the fetched instruction being executed speculatively and confirmed.

22. The method of claim 20, further comprising updating the inflight array and clearing the SIN pointer responsive to the fetched instruction being executed speculatively and cancelled.

23. The method of claim 15, further comprising receiving a tick bit and selecting a next non-inflight register generation number for the register address responsive to the tick bit being set in the fetched instruction.

* * * * *